US009160267B2

(12) United States Patent
Omata et al.

(10) Patent No.: US 9,160,267 B2
(45) Date of Patent: Oct. 13, 2015

(54) AC MOTOR CONTROL APPARATUS (71) Applicant: DENSO CORPORATION, Kariya, Aichi-pref. (JP)

(72) Inventors: Ryuji Omata, Anjo (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 13/774,619

(22) Filed: Feb. 22, 2013

(65) Prior Publication Data
US 2013/0214712 A1 Aug. 22, 2013

(30) Foreign Application Priority Data

Feb. 22, 2012 (JP) .................................. 2012-35960

(51) Int. Cl.
H02P 21/00 (2006.01)
H02P 25/28 (2006.01)
H02P 21/14 (2006.01)

(52) U.S. Cl.
CPC ............ H02P 21/14 (2013.01); H02P 21/0035 (2013.01)

(58) Field of Classification Search
CPC ..... H02P 21/14; H02P 21/00; H02P 21/0035; Y02T 10/643
USPC .................. 318/804, 400.02, 400.01, 400.33; 307/151
See application file for complete search history.

(56) References Cited

U.S. PATENT DOCUMENTS

| 6,229,719 | B1 * | 5/2001 | Sakai et al. ...................... 363/37 |
| 6,630,809 | B2 * | 10/2003 | Chen et al. ..................... 318/804 |
| 6,781,333 | B2 * | 8/2004 | Koide et al. ................... 318/432 |
| 8,143,838 | B2 | 3/2012 | Akiyama |
| 2001/0002784 | A1 | 6/2001 | Masaki et al. |
| 2003/0020428 | A1 | 1/2003 | Masaki et al. |
| 2004/0051495 | A1 | 3/2004 | Kaneko et al. |
| 2004/0263114 | A1 | 12/2004 | Kaneko et al. |

(Continued)

FOREIGN PATENT DOCUMENTS

GB 2481328 A * 12/2011
JP 10-225199 8/1998

(Continued)

OTHER PUBLICATIONS

Office Action (9 pages) dated Sep. 3, 2014, issued in copending U.S. Appl. No. 13/774,279 to Omata, filed Feb. 22, 2013.

(Continued)

*Primary Examiner* — Bentsu Ro
*Assistant Examiner* — Zemenay Truneh
(74) *Attorney, Agent, or Firm* — Nixon & Vanderhye PC (57) ABSTRACT A reference current phase sensing part of a sensor phase (W) calculates an α-axis current iα and a β-axis current iβ in a fixed coordinate system formed with respect to a sensor phase as a base. The α-axis current iα is calculated based on a sensed current iw.sns of the sensor phase and a β-axis current iβ is calculated based on command currents iu* and iv* of the other two phases (U, V) determined from a d-axis command current id* and a q-axis command current iq*. Then a current phase $x\theta = \tan^{-1}(i\beta/i\alpha)$ is calculated. A basic wave estimating part calculates an estimated current iu.est of the other phase by calculating an estimation coefficient corresponding to the reference current phase xθ of the sensor phase and multiplying the sensed current iw.sns of the sensor phase by the estimation coefficient.

6 Claims, 6 Drawing Sheets

(56) References Cited

U.S. PATENT DOCUMENTS

| | | | |
|---|---|---|---|
| 2006/0006825 A1 | 1/2006 | Inaguma et al. | |
| 2007/0069681 A1 | 3/2007 | Imura et al. | |
| 2008/0079385 A1* | 4/2008 | Hashimoto et al. | 318/801 |
| 2008/0129243 A1 | 6/2008 | Nashiki | |
| 2008/0157709 A1 | 7/2008 | Tobari et al. | |
| 2009/0160377 A1 | 6/2009 | Yamada | |
| 2010/0123418 A1* | 5/2010 | Itoh et al. | 318/400.02 |
| 2010/0194319 A1 | 8/2010 | Ito et al. | |
| 2010/0194329 A1 | 8/2010 | Lu et al. | |
| 2010/0207555 A1 | 8/2010 | Ide et al. | |
| 2011/0012544 A1* | 1/2011 | Schulz et al. | 318/400.02 |
| 2011/0248659 A1 | 10/2011 | Balazovic et al. | |
| 2012/0007528 A1 | 1/2012 | Nakatsugawa et al. | |
| 2012/0212162 A1 | 8/2012 | Wu et al. | |

FOREIGN PATENT DOCUMENTS

| | | |
|---|---|---|
| JP | 2000-175483 | 6/2000 |
| JP | 2001-145398 | 5/2001 |
| JP | 2001-309697 | 11/2001 |
| JP | 2003-037990 | 2/2003 |
| JP | 2004-064903 | 2/2004 |
| JP | 2004-159391 | 6/2004 |
| JP | 2007-215306 | 8/2007 |
| JP | 2008-050075 | 3/2008 |
| JP | 2008-086139 | 4/2008 |

OTHER PUBLICATIONS

Omata et al, U.S. Appl. No. 13/774,590, filed Feb. 22, 2013.
Omata et al, U.S. Appl. No. 13/774,667, filed Feb. 22, 2013.
Omata et al, U.S. Appl. No. 13/774,279, filed Feb. 22, 2013.
Omata et al, U.S. Appl. No. 13/774,295, filed Feb. 22, 2013.
Office Action (11 pgs.) dated Aug. 19, 2014 issued in co-pending U.S. Appl. No. 13/744,590.
Office Action (1 page) dated Jan. 24, 2014 issued in corresponding Japanese Application No. 2012-035961 and English translation (1 page).
Office Action (11 pgs.) dated Oct. 8, 2014 issued in co-pending U.S. Appl. No. 13/774,667.
Notice of Allowance dated Apr. 3, 2015 issued in co-pending U.S. Appl. No. 13/774,279 (10 pgs.).
Office Action (15 pages) date Feb. 6, 2015 issued in co-pending U.S. Appl. No. 13/774,667.
Notice of Allowance dated Mar. 17, 2015 issued in co-pending U.S. Appl. No. 13/774,590.
Notice of Allowance dated Jul. 22, 2015, issued in copending U.S. Appl. No. 13/774,667 of Omata, filed Feb. 22, 2013 (11pages).

* cited by examiner

AC MOTOR CONTROL APPARATUS

CROSS REFERENCE TO RELATED APPLICATION

The present application is based on and incorporates herein by reference Japanese patent application 2012-35960 filed on Feb. 22, 2012.

TECHNICAL FIELD

The present disclosure relates to an AC motor control apparatus including a three-phase motor and a current sensor for sensing a current in one phase of the motor.

BACKGROUND

In recent years, because of the global need for lower fuel consumption and less exhaust emission, electric and hybrid vehicles mounted with an AC motor as a mechanical power source are proposed. By way of example, a hybrid vehicle is mounted with a DC power supply, which may be a secondary battery, an electric power converter, which includes inverters, and AC motors. The power supply is connected to the motors via the power converter. The inverters convert the DC voltage from the power supply into AC voltages for driving the motors.

The hybrid or electric vehicle is provided with a control apparatus, which includes two or three current sensors for sensing the currents in two phases or three phases of a three-phase motor. The apparatus controls the motor according to the outputs (sensed currents) from the current sensors. Thus, it is necessary to provide two or three current sensors for each of motors. This results in a bar to simplification of the parts of the inverter that include three-phase output terminals. This also results in a bar to reduction of the cost of a motor control system of the vehicle.

Patent documents 1 (JP 2004-64903A), 2 (JP H10-225199A), 3 (JP 2001-145398A, U.S. Pat. No. 6,229,719), 4 (JP 2004-159391A) and 5 (JP 2008-86139A, US 2008/0079385) disclose exemplary AC motor control apparatuses, which use one current sensor relative to plural phases.

In patent document 1, one current sensor is provided in a DC power supply line to sense a current flowing in a bus. If the current sensor is provided in the DC power supply line in a control system for a high power AC motor mounted in a vehicle, not only the assembling work near the DC power supply line is complicated but also extension of the DC power supply line causes current conduction noise. Thus an inverter will become large and expensive.

In patent document 2, a d-axis current Id and a q-axis current Iq are calculated from a sensed current of one phase among three phases by using a state equations determined in accordance with motor constants. According to this technology, since the motor constants vary with temperature, it is likely that an estimation error becomes large when the d-axis current Id and the q-axis current Iq are calculated by solving the state equations. Thus motor control cannot be stabilized. Further, complicated calculation processing is needed and hence it is not readily possible to implement such a technology in a control ECU (microcomputer).

In patent document 3, a d-axis current Id and a q-axis current Iq of an AC motor are calculated by d-q conversion of a sensed current of one phase among three phases and estimated phase currents of other two phases. The currents Id and Iq are averaged by first-order delay filters and inversely d-q converted to estimate phase currents of the other two phases. According to this technology, a delay is caused in the estimated current and motor control cannot be stabilized by an influence of a first-order delay filter provided for averaging, when a torque change or a rotation speed change is required as in a vehicle.

In patent document 4, one current sensor is provided for sensing a current flowing in one phase (for example, U-phase) among phases of an AC motor and currents of the other two phases (for example, V-phase and W-phase) are estimated based on a current of one phase (for example, U-phase) sensed by the current sensor, d-axis and q-axis command currents, and electrical angle information of the AC motor.

Specifically, this technique includes: determining a U-phase current phase angle θ' (=θ+α) by adding the command current phase angle β between the q-axis and the vector resultant from the d-axis command current Id* and q-axis command current Iq* of the AC motor to the angle θ between the rotor of the motor and the U-phase axis of the stator of the motor; calculating a current amplitude Ia from the U-phase current phase angle θ' and the sensed current Iu in the U-phase according to the following equation (A); calculating estimated currents Iv and Iw in the V-phase and W-phase respectively from the current amplitude Ia and U-phase current phase angle θ' according to the following equations (B) and (C); calculating an d-axis estimated current Id and an q-axis estimated current Iq from the sensed current Iu in the U-phase and the estimated currents Iv and Iw in the V-phase and W-phase respectively; and performing the feedback control of the current in the AC motor by so calculating a command voltage for the motor that the estimated currents Id and Iq equal the command currents Id* and Iq* respectively.

$$Ia=Iu/[\sqrt{1/3}\times\{-\sin(\theta')\}] \quad (A)$$

$$Iv=\sqrt{(1/3)}\times Ia\times\{-\sin(\theta'+120°)\} \quad (B)$$

$$Iw=\sqrt{(1/3)}\times Ia\times\{-\sin(\theta'+240°)\} \quad (C)$$

A d-axis estimated current Id and a q-axis estimated current Iq are calculated based on the sensed current Iu of one phase and the estimated currents Iv and Iw of the other two phases. Command voltages for the AC motor are calculated and the current flowing to the AC motor is feedback-controlled so that the estimated currents Id and Iq attain the command currents Id* and Iq*.

Here, a current vector of the AC motor follows a command current vector (current vector corresponding to a current command value), while fluctuating relative to the command current vector because of influence of a control error, a feedback control and the like. Thus a deviation (deviation) arises between an actual current phase and a command current phase and hence the command current phase does not accurately reflect the actual current phase.

However, the actual current phase is not considered at all in this method. The estimated currents of the other two phases are calculated by using the U-phase current phase angle determined from the command current phase angle. As a result, the estimated currents cannot be calculated sufficiently accurately and the AC motor will not be controlled properly.

In patent document 5, one current sensor is provided to sense a current flowing in one phase (for example, U-phase) of plural phases of an AC motor. A sensed current of the U-phase sensed by this current sensor is used together with three-phase command currents of the AC motor to estimate currents of the other two phases (for example, V-phase and W-phase).

Specifically, the AC motor is controlled by means of a d-q conversion using an electrical angle based on a sensed current Iu of the U-phase and command currents Iv* and Iw* of the other two phases of three command currents Iu*, Iv* and Iw*, which are calculated from a d-axis command current Id* and a q-axis command current Iq* of the AC motor based on the electrical angle. The command currents of the other two phases are not sensed by the current sensor. However, similarly to patent document 4, the actual current phases cannot be accurately detected if the three-phase command currents are substituted in the other two phases, for which no current sensor is provided. Therefore, in a vehicle, in which a torque and a rotation speed are required to change from time to time, estimated currents will not be calculated sufficiently accurately, and hence the AC motor will not be controlled properly.

SUMMARY

It therefore an object to provide an AC motor control apparatus, which stably drives an AC motor having a current sensor in only one of three phases of a three-phase AC motor (one phase among three-phase outputs of an inverter).
According to one aspect, an AC motor control apparatus is provided for a system, which includes a three-phase AC motor having a first phase, a second phase and a third phase, and a current sensor for sensing a current flowing in the first phase. The AC motor control apparatus includes a controlling part configured to control power supply to the AC motor. The controlling part includes a current estimating part, which is configured to calculate a reference current phase of the first phase, based on an α-axis current and a β-axis current in a fixed coordinate system defined by an α-axis and a β-axis, which are in a same direction as the first phase and perpendicular to the first phase, respectively, and calculate an estimated current of at least a second phase other than the first phase based on the reference current phase of the first phase and the sensed current of the first phase.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

An AC motor control apparatus will be described below with reference to embodiments, which are applied to a driving system of a hybrid vehicle mounted with AC motors and an internal combustion engine as mechanical power parts.

Figure 1:
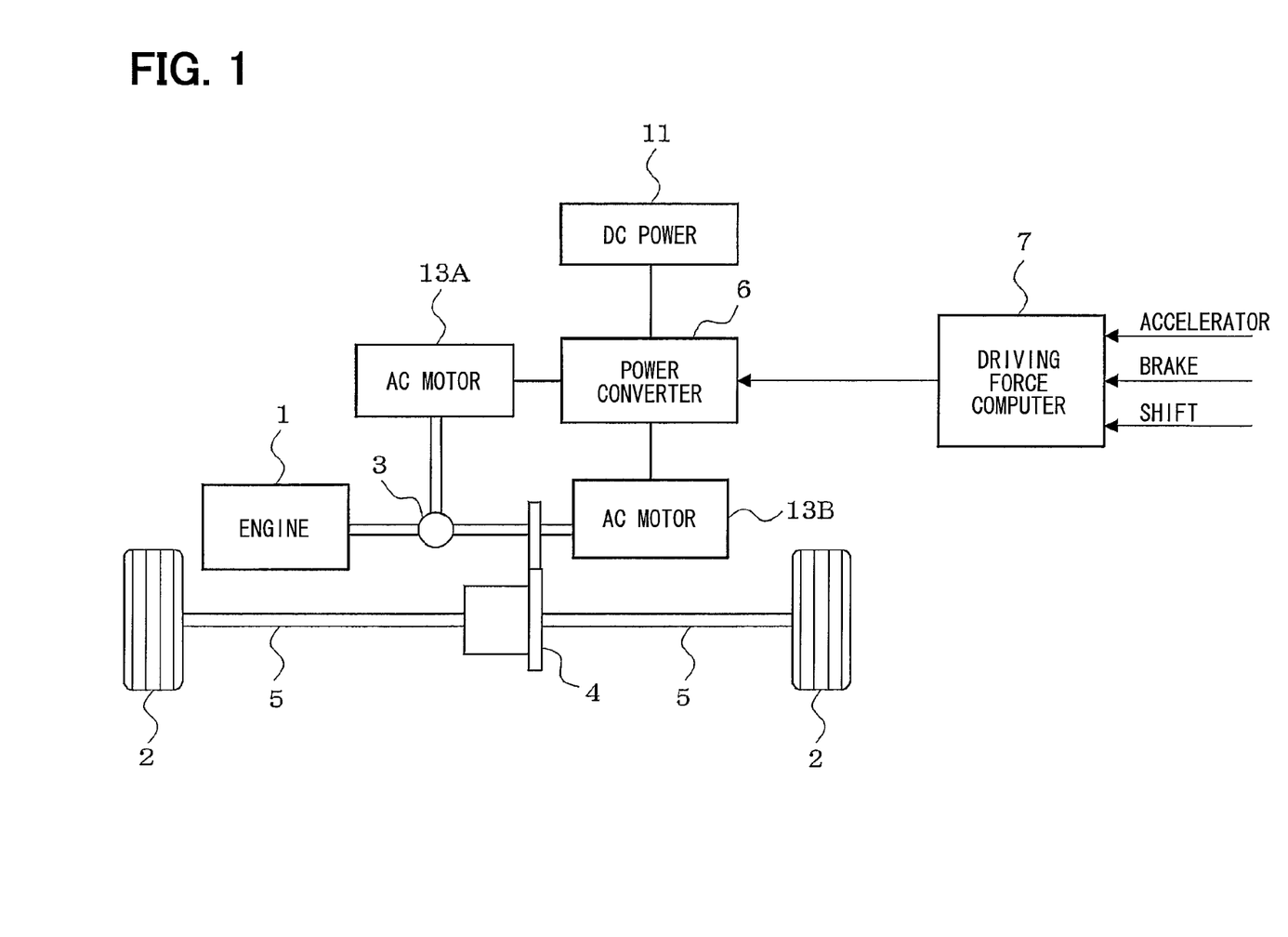
FIG. 1 is a schematic diagram of a driving system of a hybrid vehicle.

Referring to FIG. 1, a hybrid vehicle is mounted with an internal combustion engine 1, a first AC motor 13A, and a second AC motor 13B. The driving of the first AC motor 13A by the output from the engine 1 transmits driving force to a shaft of the second AC motor 13B. Mainly, the transmitted driving force and the driving force of the second AC motor 13B drive tire wheels 2 fixed to an axle 5. The crankshaft of the engine 1 and the shafts of the motors 13A and 13B are coupled together by a mechanical power divider 3 (for example, a planetary gear mechanism). The shaft of the second AC motor 13B is coupled to the axle 5 by a differential reduction gear 4. The motors 13A and 13B are connected to a DC power supply 11, which may be a secondary battery, via an electric power converter 6, which includes inverters. The motors 13A and 13B transmit electric power to the power supply 11 and receive electric power from it through the converter 6.

A driving force computer circuit 7 includes a computer for controlling the whole vehicle. The computer circuit 7 detects an operating state of the vehicle by reading in an accelerator signal output from an accelerator sensor (not shown), a brake signal output from a brake switch (not shown), a shift signal output from a shift switch (not shown), and signals output from other sensors and switches. The computer circuit 7 exchanges control signals, data signals, etc. with an engine control circuit (not shown), which controls the operation of the engine 1, and a motor control circuit 16 (FIG. 2), which controls the operation of the motors 13A and 13B. The computer circuit 7 controls the driving force of the engine 1 and motors 13A and 13B by outputting a driving force requirement according to the operating state of the vehicle.

Figure 2:
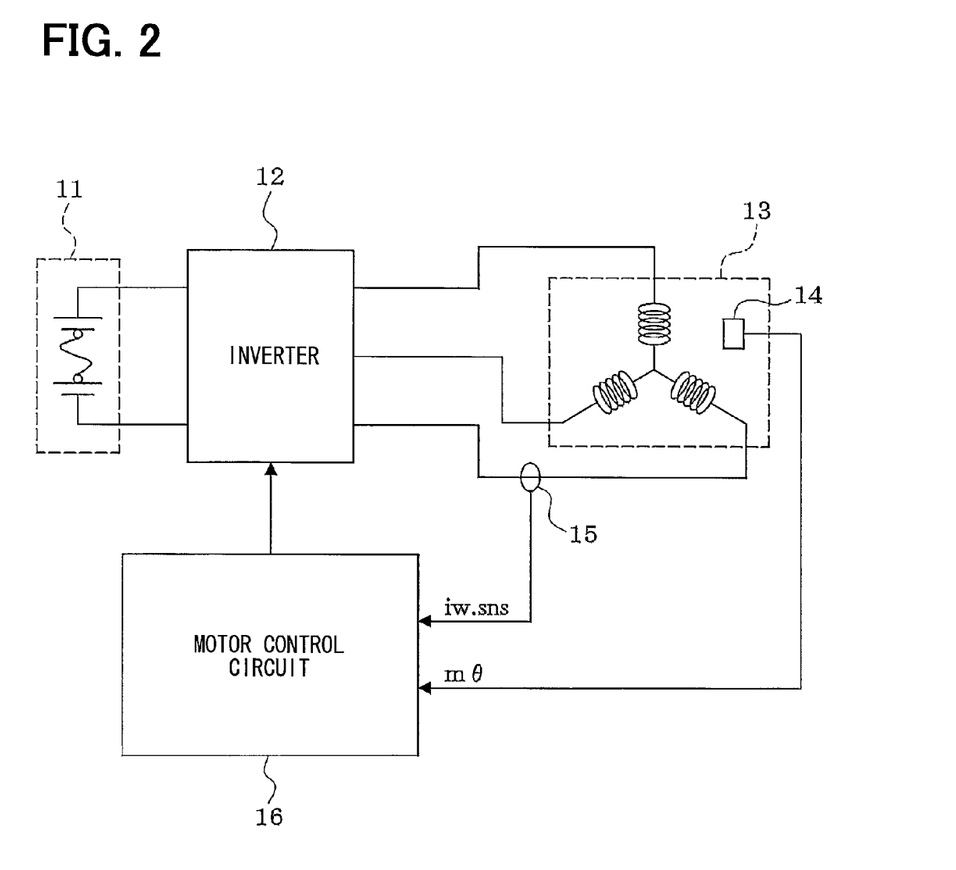
FIG. 2 is a schematic diagram of an AC motor control apparatus, which is applied to the driving system shown in FIG. 1, according to an embodiment.

As shown in FIG. 2, the AC motor control apparatus is mounted on the hybrid vehicle. Because the AC motor control apparatus for the AC motors 13A and 13B are substantially identical in structure, the AC motor control apparatus for an AC motor 13 representing the motors 13A and 13B will be described below.

The DC power supply 11, which may be a secondary battery, is connected to a voltage-controlled three-phase inverter 12, which drives the AC motor 13. Alternatively, the power supply 11 may be connected to the inverter 12 via a boost converter or the like.

The AC motor 13 is a three-phase permanent-magnet synchronous motor with permanent magnets in its rotor. The motor 13 is mounted with a rotational position sensor 14 (for example, a resolver) for sensing the rotational position (rotational angle) of the rotor. The motor 13 is also mounted with only one current sensor 15 for sensing the current in one phase (sensor phase) of the motor 13. The current sensor 15 senses the current flowing in the W-phase as the sensor phase of the motor 13. The motor 13 may not be a permanent-magnet synchronous motor, but may be an induction motor or another synchronous motor. The sensor phase, for example W-phase, is exemplarily referred to as a first phase, and U-phase and V-phase are referred to as a second phase and a third phase.

The inverter 12 converts the DC voltage from the DC power supply 11 into three-phase voltages U, V, and W in accordance with six three-phase arm voltage command signals UU, UL, VU, VL, WU and WL output from the motor control circuit 16 (controlling part). The inverter 12 drives the AC motor 13 by applying the voltages U, V, and W to the motor 13.

The motor control circuit 16 controls a switching operation of the inverter and regulates three-phase AC voltages supplied to the AC motor 13 so that an output torque of the AC motor 13 attains a target torque. For this purpose, the current flowing in the sensor phase of the AC motor 13 is detected and feedback-controlled (current F/B control) so that a deviation between the command current, which corresponds to the target torque, and an estimated current (described later), which is calculated based on control information such as detection values of the current sensor 15 and the rotational position sensor 14, is reduced.

Figure 3:
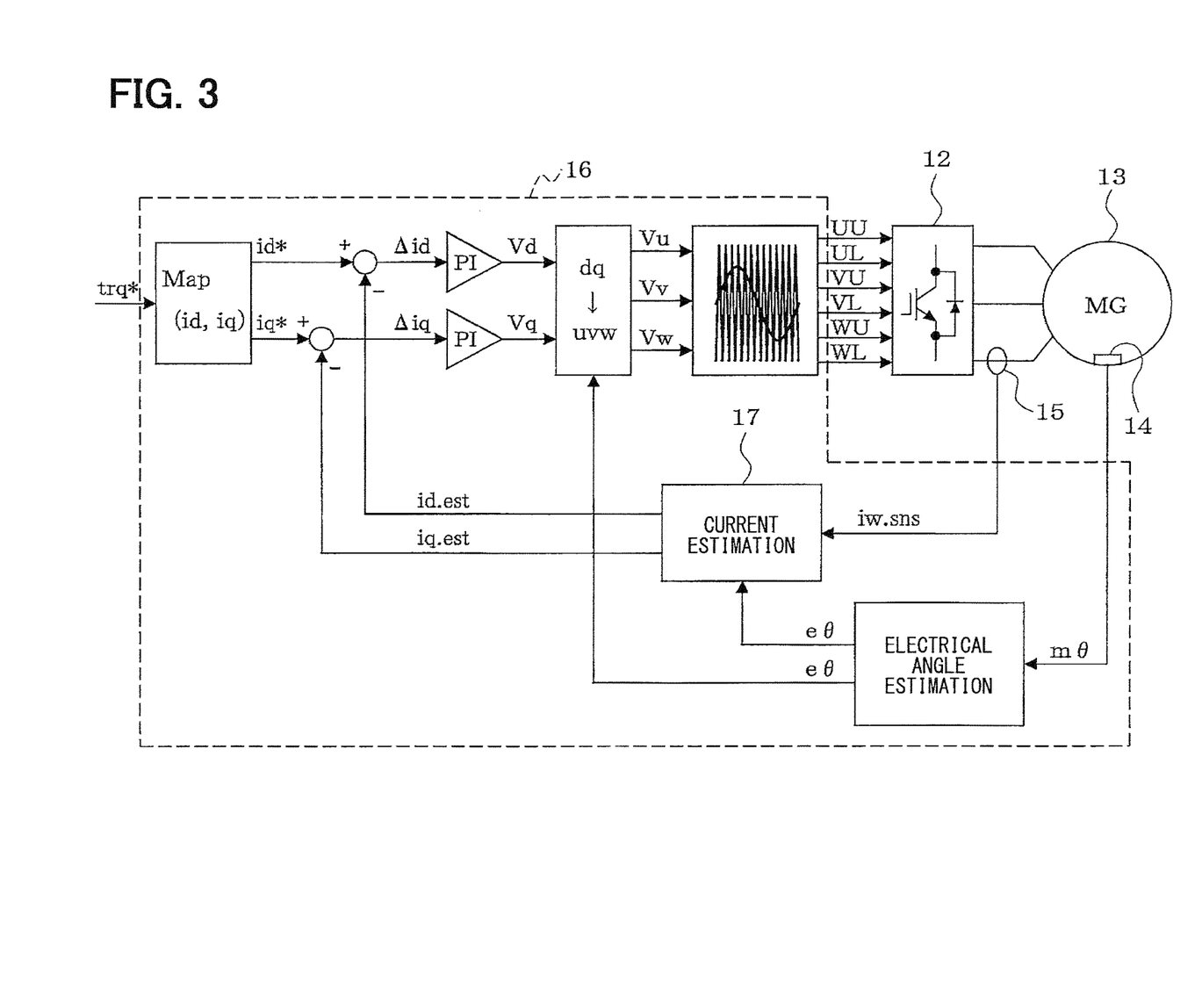
FIG. 3 is a block diagram showing a current feedback control for an AC motor of the hybrid vehicle.

As shown in FIG. 3, the motor control circuit 16 calculates, based on a command torque trq* and by using data map or mathematical equations, a d-axis command current id* and a q-axis command current iq* (those may be expressed as a current command vector) in a rotating coordinate system (d-q coordinate system), which is set as a rotor rotating coordinate of the AC motor 13.

The motor control circuit 16 further calculates an electrical angle eθ based on the rotational position mθ (rotation angle) of the AC motor 13 detected by the rotational position sensor 14. In the motor control circuit 16, a current estimating part 17 calculates the d-axis estimated current id.est and the q-axis estimated current iq.est (these may be expressed as an estimation current vector) in the rotation coordinate system based on the sensed current iw.sns of the sensor phase (W-phase in this embodiment) of the AC motor 13 detected by the current sensor 15 and the electrical angle eθ of the AC motor 13. In addition, the command currents iu* and iv* of the other two phases (U-phase and V-phase) calculated by an inverse d-q conversion based on the d-axis command current id*, q-axis command current iq* and the electrical angle eθ of the AC motor 13.

The motor control circuit 16 then calculates a d-axis command voltage Vd and a q-axis command voltage Vq. The d-axis command voltage Vd is calculated by the PI control or the like to reduce a deviation Δid between the d-axis command current id* and the d-axis estimated current id.est. The q-axis command voltage Vq is calculated by the PI control or the like to reduce a deviation Δiq between the q-axis command current iq* and the q-axis estimated current iq.est.

The motor control circuit 16 calculates three-phase command voltages Vu, Vv and Vw based on the d-axis command voltage Vd, the q-axis command voltage Vq and the electrical angle ee of the AC motor 13. The motor control circuit 16 then converts these three-phase command voltages Vu, Vv and Vw into three-phase six-arm voltage command signals UU, UL, VU, VL, WU and WL by PWM control method, which is represented by, for example, a triangular wave comparison method or a spatial vector modulation method. The motor control circuit 16 outputs the three-phase six-arm voltage command signals UU, UL, VU, VL, WU and WL to the inverter 12. The inverter 12 converts the DC voltage to three-phase AC voltages based on the three-phase six-arm voltage command signals UU, UL, VU, VL, WU and WL, and supplies these AC voltages to the motor 13. Thus the AC motor 13 generates torque when the three-phase currents are supplied. The motor control circuit 16 detects the AC current flowing in the sensor phase (W-phase) of the AC motor 13 and F/B-controls (current F/B control) the AC current so that the output torque attains the target torque Trq* (command torque). That is, the motor control circuit 16 operates to reduce a deviation between the command currents id* and iq* corresponding to the command torque and the estimated currents id.est and iq.est.

A method for estimating the current in the AC motor 13 by means of the current estimating part 17 will be described below.

Generally, the currents iu, iv and iw respectively in the three phases of the AC motor 13 vary at a phase difference of 120 degrees between them with the electrical angle eθ, the amplitude and phase of a current vector, and so on. By way of example, for the calculation of an estimated current iu.est in the U-phase of the motor 13 from the sensed W-phase current iw.sns, the current estimating part 17 may use the electrical angle xθ that is 0 degree when the sensed current iw.sns crosses zero (0 ampere) from a negative polarity to a positive polarity, and that is 180 degrees when this current crosses zero from the positive polarity to the negative polarity. The angle xθ is a current phase relative to the W-phase, and is equivalent to the angle between the W-phase and the current vector. In this case, the sensed current iw.sns and the estimated U-phase current iu.est can be expressed respectively by the following equations (1) and (2), where Ia is the current amplitude.

$$iw.sns = Ia \times \sin(x\theta) \quad (1)$$

$$iu.est = Ia\alpha \times \sin(x\theta - 120°) \quad (2)$$

By using the relationship expressed by the equation (1), it is possible to transform the equation (2) as follows.

$$\begin{aligned}
iu.est &= Ia \times \sin(x\theta - 120°) \\
&= -\frac{1}{2} \times Ia \times \sin(x\theta) - \frac{\sqrt{3}}{2} \times Ia \times \cos(x\theta) \\
&= -\frac{1}{2} \times iw.sns - \frac{\sqrt{3}}{2} \times \frac{Ia \times \sin(x\theta)}{\tan(x\theta)} \\
&= \left\{ -\frac{1}{2} - \frac{\sqrt{3}}{2} \times \frac{1}{\tan(x\theta)} \right\} \times iw.sns
\end{aligned}$$

This makes it possible to express the estimated U-phase current iu.est in the U-phase with the sensed W-phase current iw.sns and the current phase xθ relative to the W-phase by the following equation (3). This also makes it possible to express the estimated U-phase current iu.est to be expressed with an estimation factor fu(xθ) according to the current phase xθ by the following equation (4).

$$iu.est = \left\{ -\frac{1}{2} - \frac{\sqrt{3}}{2} \times \frac{1}{\tan(x\theta)} \right\} \times iw.sns \quad (3)$$

$$iu.est = fu(x\theta) \times iw.sns \quad (4)$$

$$\text{where } fu(x\theta) = -\frac{1}{2} - \frac{\sqrt{3}}{2} \times \frac{1}{\tan(x\theta)} \quad (5)$$

Figure 4:
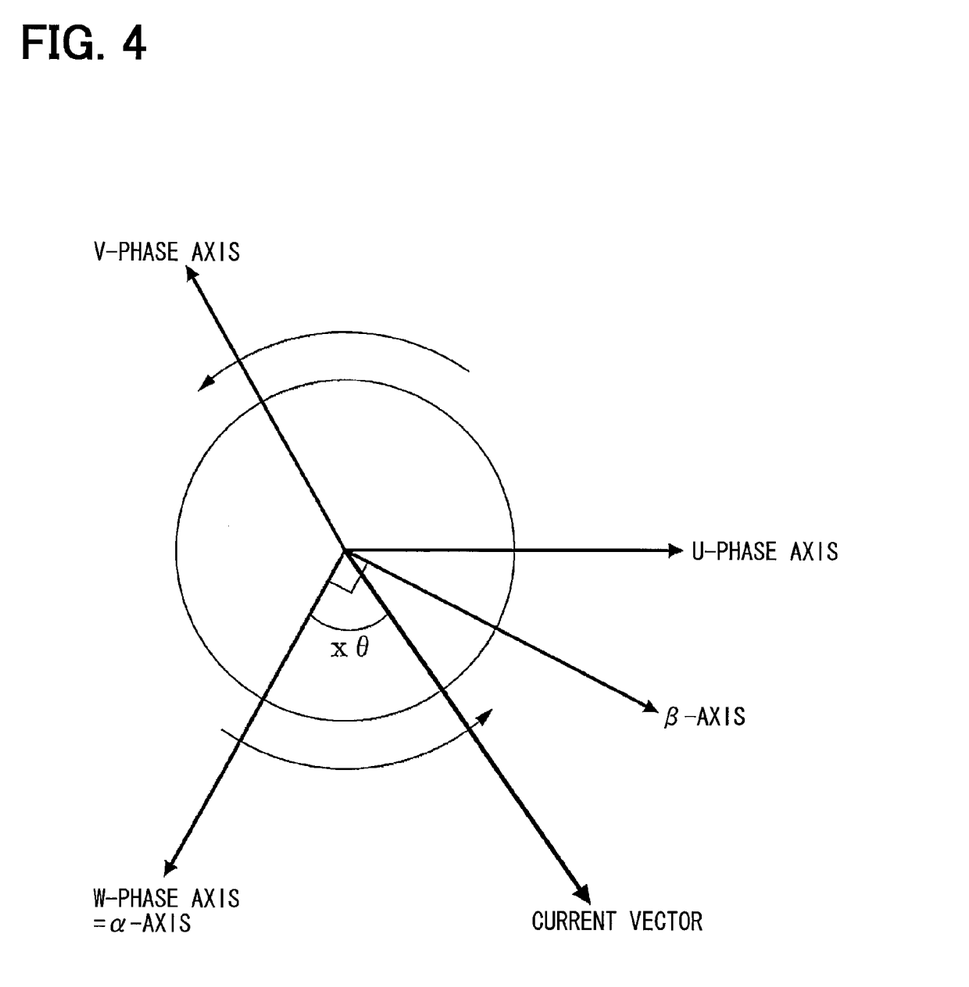
FIG. 4 shows a fixed coordinate system (α-β coordinate system) on a basis of a W-phase of the AC motor.

FIG. 4 shows a fixed coordinate system (α-β coordinate system) set with reference to the sensor phase (W-phase) of the AC motor 13. In this fixed coordinate system, which is set on the basis of the W-phase, it is possible to express an α-axis current iα and a β-axis current iβ as represented by the following equations (6) and (7) by using the currents iu, iv and iw of the three phases. Here, the α-axis is in the same direction as an axis of the sensor phase (W-phase axis) and the β-axis is perpendicular to the sensor phase axis (W-phase axis). K is a conversion factor.

$$i\alpha = K \times \{iw - (1/2) \times iu - (1/2) \times iv\} = K \times (3/2) \times iw \quad (6)$$

$$i\beta = K \times ((\sqrt{3}/2) \times iu - \sqrt{3}/2 \times iv) \quad (7)$$

The following equation (8) is derived by using the sensed current iw.sns of the sensor phase (W-phase) as the W-phase current iw in the equation (6). Further, the following equation (9) is derived by using, as the U-phase current iu and the V-phase current iv of the equation (7), the U-phase command current iu* and the V-phase command current iv*, which are determined by an inverse d-q conversion based on the electrical angle ee, the d-axis command current id* and the q-axis command current iq* of the AC motor 13. Although it is exemplified here that the command current is used to derive the β-axis current iβ, different values other than the command current may be used to derive the β-axis current iβ.

$$i\alpha = K \times \{iw - (1/2) \times iu - (1/2) \times iv\} = K \times (3/2) \times iw \quad (6)$$

$$i\beta = K \times ((\sqrt{3}/2) \times iu^* - \sqrt{3}/2 \times iv^*) \quad (9)$$

A sensor phase reference current phase xθ, that is, a current phase xθ relative to the W-phase, can be calculated from the currents iα and iβ according to the following equation (10). For the calculation of the current phase xθ as $\tan^{-1}$, this phase may, depending on the definition of the currents iα and iβ, not be an angle synchronous with the W-phase. This depends on axis definition (for example, an exchange of the α-axis and β-axis or sign change). In order that the current phase xθ may be 0 degree when the sensed W-phase current iw.sns crosses zero (0 ampere) from the negative polarity to the positive polarity, and that the phase xθ may be 180 degrees (an angle synchronous with the W-phase) when the sensed current iw.sns crosses zero from the positive polarity to the negative polarity, the phase xθ may be calculated after an exchange of the currents iα and iβ or sign handling, or otherwise the phase difference of ±90 degrees due to the perpendicular relationship may suitably be added directly to or subtracted directly from the phase xθ.

$$x\theta = \tan^{-1}(i\beta/i\alpha) \quad (10)$$

Figure 5:
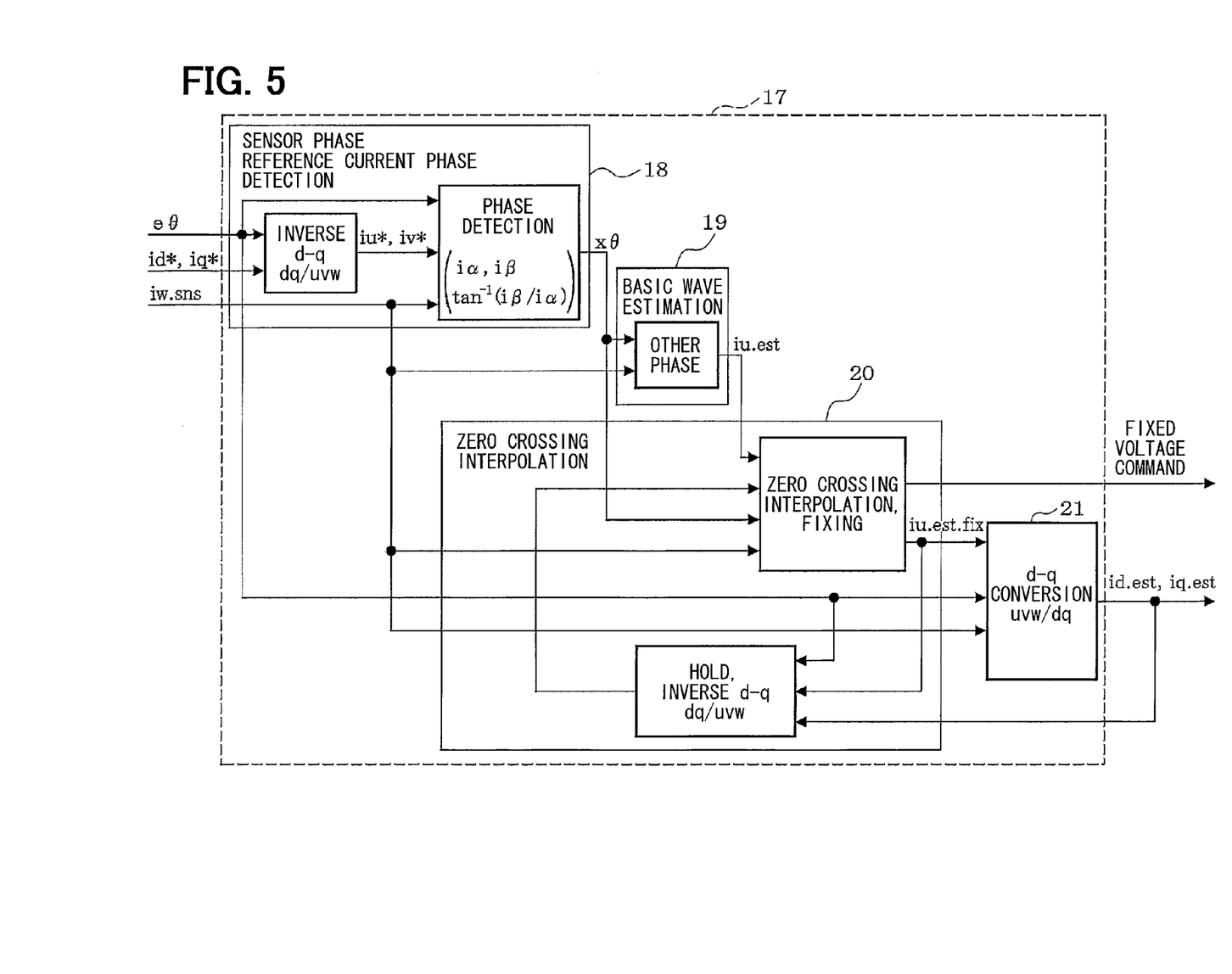
FIG. 5 is a block diagram showing a current estimating part.

In case of estimation of the currents of the other phases than the sensor phase of the AC motor 13, as shown in FIG. 5, a current phase reference current phase detection part 18 calculates the command currents iu* and iv* of other two phases (U-phase and V-phase) by the inverse d-q conversion based on the electrical angle eθ, the d-axis command current id* and the q-axis command current iq* of the AC motor 13. Then, by using the sensed current iw.sns of the sensor phase (W-phase) sensed by the current sensor 15, the α-axis current iα and the q-axis current iβ are calculated by the equation (8) by using the command currents iu* and iv* of the other two phases (U-phase and V-phase). The sensor phase reference current phase xθ is calculated by the equation (10) by using the α-axis current iα and the β-axis current iβ.

Subsequently, the basic wave estimating part 19 calculates the estimation factor fu(xθ) according to the current phase xθ relative to the W-phase according to the equation (5), a data map or the like, and calculates the estimated U-phase current iu.est from the estimation factor fu(xθ) and the sensed W-phase current iw.sns according to the equation (4). Alternatively, the estimating part 19 may calculate an estimated current iu.est in the U-phase directly from the current phase xθ relative to the W-phase and the sensed W-phase current iw.sns according to the equation (3).

Generally, if an operational equation is packaged in a processing unit such as a control ECU (microcomputer), the unit processes the equation with discrete time, not continuous time, and handles sensed values and computed values as discrete values based on a specified resolution (LSB). Therefore, if a division by zero occurs in the equation (3), it is preferable to set a limit to the estimation factor fu(xθ) or the term 1/tan(xθ) in the factor in order to prevent the estimated current from being calculated as an unintended value under the influence of the discrete system. For the implementation of the equation (3), it is effective to map the estimation factor fu(xθ) or the term 1/tan(xθ) in this factor with the argument xθ in order to avoid multiplications and divisions, which are high in processing load. In this case, it is preferable to set a limit to the estimation factor fu(xθ) or the term 1/tan(xθ) on the map. Such measures facilitate application to a discrete system, making it possible to minimize the processing load on the microcomputer. Consequently, there is no need to replace the microcomputer with an expensive one that is high in processing performance.

Subsequently, if the sensed W-phase current iw.sns is 0 ampere, the zero-crossing time point interpolation part 20 interpolates the estimated current iu.est calculated as 0 ampere according to the equation (3) or (4) in the U-phase. Normally (when the W-phase current iw does not cross zero as will be described below), the interpolation part 20 directly outputs the estimated U-phase current iu.est input from the basic wave estimating part 19. When the W-phase current iw crosses zero (when the sensed current iw.sns is 0 ampere or in a specified range that includes 0 ampere and may be 10 amperes, 5 LSB, or another suitably set range, or be specified according to a numerical equation or the like), the interpolation part 20 fixes d-axis command voltage Vd and the q-axis command voltage Vq for the AC motor 13, interpolates the estimated U-phase current iu.est, outputs the interpolated current, and sets the interpolated current as an estimated current iu.est.fix in the U-phase for the d-q conversion. Alternatively, the interpolation part 20 may interpolate the estimated U-phase current iu.est by directly holding it at the previous value or a previous value of it. Alternatively, the interpolation part 20 may interpolate the estimated U-phase current iu.est by: holding the d-axis estimated current id.est and q-axis current iq.est at the previous values or previous values of them; performing an inverse d-q conversion for calculating the estimated U-phase current iu.est from the held currents id.est and iq.est; and interpolating the estimated U-phase current iu.est with the estimated currents obtained in the three phases by the inverse d-q conversion. The estimated U-phase current iu.est may be interpolated by being calculated by a part other than mentioned in this embodiment, or be interpolated by another suitable method.

Subsequently, the d-q conversion part 21 calculates the d-axis estimated current id.est and q-axis current iq.est by means of the d-q conversion from the sensed W-phase current iw.sns and the estimated U-phase current iu.est.fix for this conversion.

This avoids sharp fluctuations in the estimated U-phase current iu.est by interpolating it even if it cannot be calculated accurately when the W-phase current iw crosses zero. Mere interpolation of the estimated U-phase current iu.est may make the current feedback control of the AC motor 13 unstable due to an error (estimation error made by the interpolation). However, the fixation of the command voltage Vd, Vq for the motor 13 excludes the influence of the error in the estimated U-phase current iu.est (prevents the command voltages Vd and Vq from fluctuating due to the error).

Figure 6:
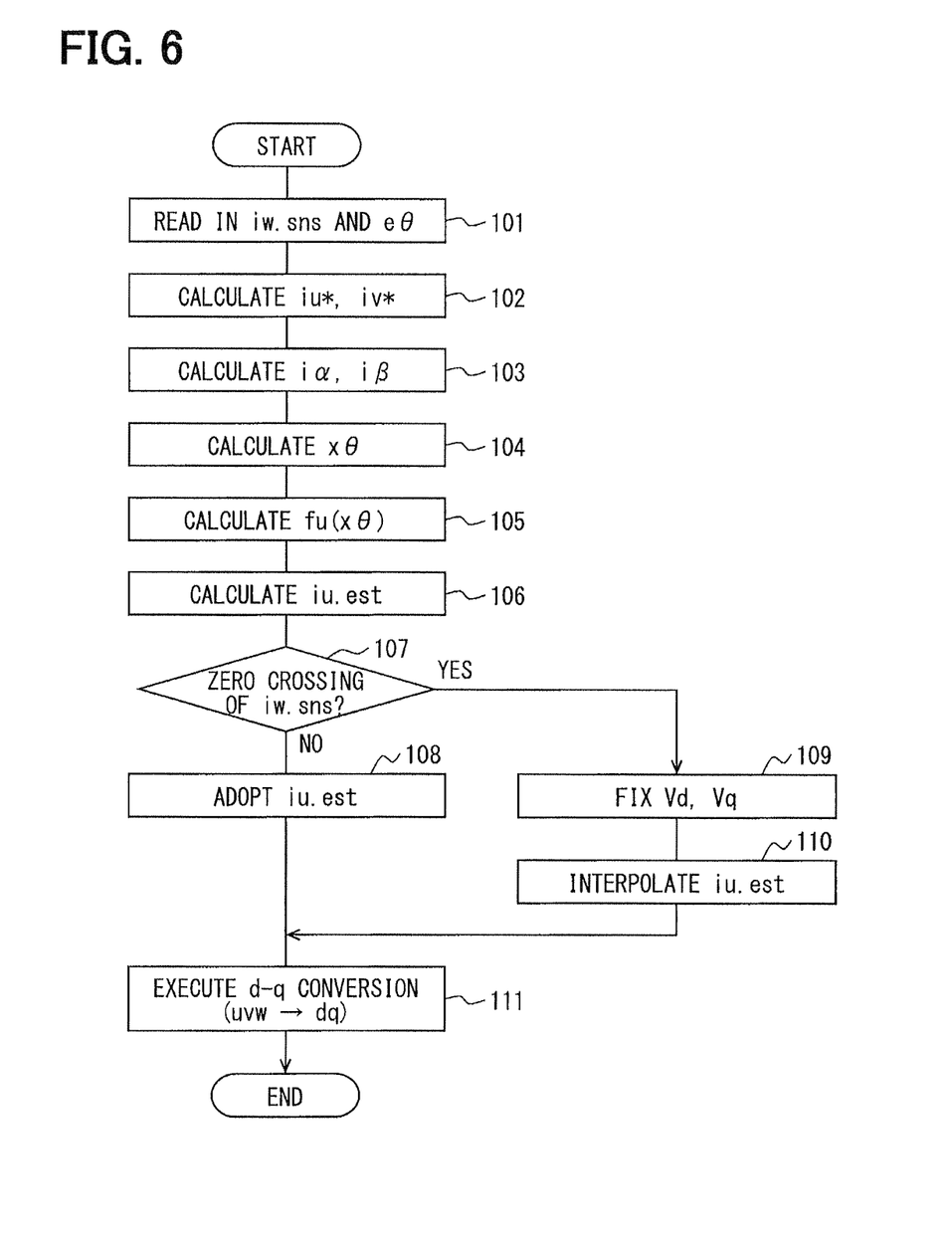
FIG. 6 is a flowchart showing processing of a current estimation routine.

The motor control circuit 16 performs the foregoing current estimation in this embodiment according to a current estimation routine shown in FIG. 6.

The motor control circuit 16 repeats the current estimation routine at a specified operation period while the circuit is on. When the routine is started, the motor control circuit 16 reads in at step 101 the current iw.sns sensed in the W-phase by the current sensor 15 and the electrical angle eθ determined from the rotational rotor position mθ sensed by the rotational position sensor 14.

Then at step 102, the inverse d-q conversion is executed to calculate the command currents iu* and iv* of the other two phases (U-phase and V-phase) based on the electrical angle eθ, the d-axis command current id* and the q-axis command current iq* of the AC motor 13.

At the following step 103, the α-axis current is iα calculated by the equation (8) by using the sensed current iw.sns of the sensor phase (W-phase). Further the β-axis current iβ is calculated by the equation (9) by using the command currents iu* and iv* of the other two phases (U-phase and V-phase). At step 104, the sensor phase reference current phase xθ is calculated by the equation (10) by using the α-axis current iα and the β-axis current iβ.

Subsequently, the current estimation routine proceeds to step 105, where the motor control circuit 16 calculates the estimation factor fu(xθ) according to the current phase xθ relative to the W-phase according to the equation (5) or the data map. Subsequently, the routine proceeds to step 106, where the motor control circuit 16 calculates the estimated current iu.est in the U-phase from the estimation factor fu(xθ) and the sensed W-phase current iw.sns according to the equation (4). Alternatively, the motor control circuit 16 may calculate an estimated current iu.est in the U-phase from the current phase xθ and the sensed W-phase current iw.sns according to the equation (3).

Subsequently, the current estimation routine proceeds to step 107, where the motor control circuit 16 checks whether the W-phase current iw is crossing zero. The checking depends on whether the sensed W-phase current iw.sns is 0 ampere. Alternatively, the checking may depend on whether the sensed W-phase current iw.sns is within the specified range including 0 ampere (for example, the absolute value of this current is equal to or smaller than a specified value, or the absolute value of the estimation factor fu(xθ) is equal to or larger than a specified value). Alternatively, the checking may depend on the current phase xθ relative to the W-phase because this phase is synchronous with the sensed W-phase current iw.sns.

If the motor control circuit 16 determines at step 107 that the W-phase current iw is not crossing zero, the current estimation routine proceeds to step 108, where the motor control circuit 16 adopts the estimated U-phase current iu.est calculated at step 106.

If the motor control circuit 16 determines at step 107 that the W-phase current iw is crossing zero, the current estimation routine proceeds to step 109, where the current control circuit 16 fixes the command voltages Vd and Vq. At step 107, the motor control circuit 16 may fix the command voltages Vd and vq directly (for example, by holding them at the previous values) or by forcing the d-axis current deviation Δid and the q-axis current deviation Δiq (FIG. 3) to be 0[A].

Subsequently, the current estimation routine proceeds to step 110, where the motor control circuit 16 interpolates the estimated U-phase current iu.est. At this step, the motor control circuit 16 may interpolate the estimated U-phase current iu.est by directly holding it at the previous value of it. Alternatively, the motor control circuit 16 may interpolate the estimated U-phase current iu.est by: holding the d-axis estimated current id.est and q-axis current iq.est at the previous values of them; performing an inverse d-q conversion for calculating the estimated U-phase current from the held currents id.est and iq.est; and interpolating the estimated U-phase current iu.est with the estimated currents obtained by the conversion. The estimated U-phase current iu.est may be interpolated by being calculated by means of other logic, or be interpolated by another suitable method.

After the motor control circuit 16 sets at step 108 or 110 the estimated U-phase current iu.est as the estimated U-phase current iu.est.fix for a d-q conversion, the current estimation routine proceeds to step 111, where the circuit executes the d-q conversion for calculating the d-axis estimated current id.est and q-axis current iq.est from the sensed W-phase current iw.sns and the estimated U-phase current iu.est.fix.

According to the embodiment described above, the reference current phase xθ of the sensor phase is calculated based on the α-axis current iα and the β-axis current iβ in the fixed coordinate system (α-β coordinate system), which is formed with respect to the sensor phase as a basis. As a result, the actual current phase xθ, which is based on the sensor phase, can be calculated accurately. Since the estimated current iu.est of the U-phase is calculated based on the reference current phase xθ of the U-phase and the sensed current iw.sns of the U-phase, the estimated current iu.est of the U-phase can be calculated accurately in consideration of influence of high harmonic components of the actual current phase xθ and various changes, which occur normally. Thus, the estimated current iu.est can be calculated with higher accuracy.

Further, according to the embodiment described above, since the d-axis and the q-axis estimated currents id.est and iq.est are calculated based on the sensed current iw.sns of the W-phase and the estimated current iu.est of the U-phase, the d-axis and the q-axis estimated currents id.est and iq.est can be calculated accurately. Since the current F/B control is performed by using the d-axis and the q-axis estimated currents, the AC motor 13 can be driven stably.

Further, according to the embodiment, the estimated current iu.est of the U-phase is calculated by calculating the estimation coefficient fu(xθ) corresponding to the reference current phase xθ of the sensor phase and calculating the estimated current iu.est of the U-phase by multiplying the sensed current iw.sns of the W-phase by the estimation coefficient fu(xθ). As a result, the estimated current iu.est of the U-phase can be calculated without using a current amplitude and hence error factor for the calculation of the estimated current iu.est can be reduced. The estimated current iu.est thus can be calculated with higher accuracy.

Further, according to the embodiment, since the current of the U-phase is estimated based on the sensed current of W-phase, it is possible to decrease influence of a gain error of the current sensor, which will arise in a conventional AC motor control system using plural current sensors. As a result, the AC motor is protected from producing output torque variations caused by the gain error. In case of a vehicle, vibration of the vehicle is reduced and commercial value of the vehicle can be maintained.

In the above-described embodiment, the current sensor 15 senses the current in the W-phase as the sensor phase. Alternatively, the sensor 15 may be connected to sense the current in the U-phase or V-phase as the sensor phase. In the embodiment, the motor control circuit 16 calculates the estimated current in the U-phase as the other phase. Alternatively, the motor control circuit 16 may calculate an estimated current in the V-phase or W-phase as the other phase. Further, the motor control circuit 16 may calculate estimated currents in two phases other than the sensor phase.

In the above-described embodiment, the AC motor control apparatus is assumed to be provided with only one inverter and only one AC motor. However, the apparatus may be provided with two or more inverters and two or more AC motors. Alternatively, the apparatus may include an inverter and two or more AC motors connected in parallel to the inverter, as exemplified in an electric train.

In order to prevent the d-q conversion from being disabled because of the current sensed in only one phase, the d-q conversion is enabled by estimating the current in a different phase. Alternatively, a new d-q conversion equation may be created that is effective even for the current sensed in only one phase. However, either method provides a mathematically equal result.

The apparatus is not limited to hybrid vehicles of the structure shown in FIG. 1. The apparatus can be applied to hybrid and electric vehicles of any structure. The apparatus is not limited to the AC motor control apparatus fitted on an electric vehicle or a hybrid vehicle but can be applied to other AC motor control apparatus as well.

What is claimed is:

1. An AC motor control apparatus for a system, which includes a three-phase AC motor having a first phase, a second phase and a third phase, and a current sensor for sensing a current flowing in the first phase, the AC motor control apparatus comprising:
   a controlling part configured to control power supply to the AC motor,
   wherein the controlling part includes a current estimating part configured to calculate a current phase angle of the first phase as a reference, based on an α-axis current and a β-axis current in a fixed coordinate system defined by an α-axis and a β-axis, which are in a same direction as the first phase and perpendicular to the first phase, respectively, and calculate an estimated current of at least the second phase other than the first phase based on a calculated current phase angle of the first phase and the sensed current of the first phase, and
   wherein the current estimating part is further configured to calculate the α-axis current and the β-axis current based on the sensed current of the first phase and a command current of at least the second phase.

2. The AC motor control apparatus according to claim 1, wherein:
   the current estimating part is further configured to calculate an estimation coefficient corresponding the calculated current phase angle of the first phase and calculate the estimated current of at least the second phase by multiplying the sensed current of the first phase by the estimation coefficient.

3. The AC motor control apparatus according to claim 2, wherein:
   the current estimating part is further configured to calculate a d-axis estimated current and a q-axis estimated current in a rotating coordinate system of the AC motor based on the sensed current of the first phase and the estimated current of at least the second phase; and
   the controlling part is configured to control the power supply to the AC motor by using the d-axis estimated current and the q-axis estimated current.

4. The AC motor control apparatus according to claim 2, wherein the current sensor is provided for only the first phase.

5. The AC motor control apparatus according to claim 2, wherein the current sensed by the current sensor current is variable with an amplitude and an electric phase angle of the current.

6. The AC motor control apparatus according to claim 1, wherein:
   the current estimating part is further configured to calculate a d-axis estimated current and a q-axis estimated current in a rotating coordinate system of the AC motor based on the sensed current of the first phase and the estimated current of at least the second phase; and
   the controlling part is configured to control the power supply to the AC motor by using the d-axis estimated current and the q-axis estimated current.

* * * * *